Aug. 2, 1960

C. P. FELDHAUSEN 2,947,930

ELECTRIC MOTOR CONTROLLERS

Filed June 25, 1956

Inventor
Cyril P. Feldhausen.
By H. R. Rather
Attorney

United States Patent Office 2,947,930
Patented Aug. 2, 1960

2,947,930

ELECTRIC MOTOR CONTROLLERS

Cyril P. Feldhausen, Wauwatosa, Wis., assignor to Cutler-Hammer, Inc., Milwaukee, Wis., a corporation of Delaware Filed June 25, 1956, Ser. No. 593,657

8 Claims. (Cl. 318—210)

This invention relates to improvements in electrical motor controllers.

While not limited thereto, the invention is especially applicable to controllers for graphic arts machinery such as printing presses and the like.

My Patent No. 2,409,264, granted October 15, 1946, and assigned to the assignee of the present application, discloses motor controllers for graphic arts machinery affording 16 different preselectable operating speeds and having apparatus for developing in the motor a high starting torque upon initiation of starting thereof. The controllers of the aforementioned patent also employ apparatus for tripping the motor speed to a low value in response to abnormal conditions and a plugging relay having a winding energized from the speed control network to drop out plugging when the motor speed approaches zero value.

It is often desirable to run graphic arts machinery at a greater number of preselectable operating speeds and to be able to adjustably control the starting torque from the master station at the press. The latter is of great advantage because the press is started at low torque for normal operation and a high starting torque is required only under abnormal conditions such as when there is a jam in the press and the like. It is also desirable to be able to adjust the operating speed without resetting the preselector to compensate for a change in the load and to adjust the trip speed to a workable value. The aforementioned adjustments must be accomplished without affecting the drop out of plugging when the motor speed approaches zero.

Accordingly, it is a primary object of the invention to provide improved means affording the aforementioned and other control functions.

A more specific object of the invention is to provide improved control means using one or more speed control contactors for affording an adjustable starting torque without supplying separate contactors therefor.

A still more specific object of the invention is to provide improved means for decelerating the motor to different adjustable lower speeds and reaccelerating to the preselected operating speed without resetting the preselector whereby the operating time is reduced and wear on the controller is decreased.

Other objects and advantages of the invention will hereinafter appear.

While the apparatus hereinafter described is effectively adapted to fulfill the objects stated, it is to be understood that I do not intend to confine my invention to the particular preferred embodiment of motor controller disclosed, inasmuch as it is susceptible of various modifications wtihout departing from the scope of the appended claims.

In the accompanying drawings:

Fig. 3 is a table indicating a preferred sequence of commutating the external secondary resistors of the motor of Fig. 1.

Figure 1:
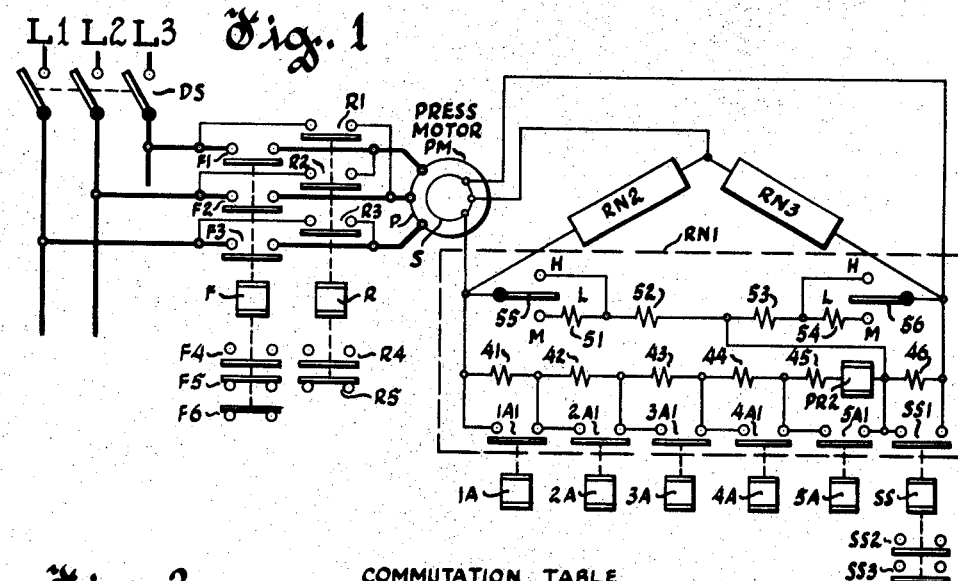
Figure 1 shows diagrammatically an alternating current motor together with power circuit connections therefor and certain secondary resistance control apparatus.

Referring to Fig. 1 there is shown a printing press motor PM having a 3-phase primary winding P and a 3-phase secondary winding S. Power to the primary winding is supplied from a power supply source (not shown) through supply lines L1, L2 and L3, a normally-open manually operable knife switch DS and normally-open contacts F1, F2 and F3 of an electromagnetic forward contactor F, or alternatively through normally-open contacts R1, R2 and R3 of an electromagnetic reverse contactor R. The aforementioned contactors control the conventional reversing connections for the motor primary winding and selective energization thereof affords forward and reverse operations of motor PM. Delta-connected secondary resistance networks RN1, RN2 and RN3 are connected across the three phases, respectively, of the secondary winding. The speed of the motor is controlled by suitable commutation of external resistance in varying amounts simultaneously in each of the phases of the secondary winding to afford speed points 1 through 32 as shown in Fig. 3. Resistance networks RN2 and RN3 are identical to resistance network RN1 except that the former two have a direct connection in place of winding PR2 of network RN1. A detailed showing of resistance networks RN2 and RN3 is therefore omitted for the sake of simplicity.

Secondary resistance network RN1 comprises five commutating resistors 41 through 45 and one trip resistor 46 series connected across one phase of the secondary winding, five normally-open commutating contacts 1A1 through 5A1 and normally-open trip contacts SS1 connected to shunt the respectively associated commutating and trip resistors. Contacts 1A1 through 5A1 and SS1 are controlled by contactors 1A through 5A and SS, respectively. Resistance network RN1 also comprises four adjusting resistors 51 through 54 and associated manual double-throw switches 55 and 56 whereby the speed regulating resistance may be adjusted to correspond to a change in the press load. Each switch 55 and 56 is adjustable from a low speed center position at L to medium speed at contact M or to high speed at contact H. Switch 55 is associated with resistors 51 and 52 so that one or both of the latter can be connected across the five commutating resistors and winding PR2 or disconnected for adjusting the running speed. Likewise switch 56 is associated with resistors 53 and 54 to connect one or both of the latter across trip resistor 46 or to disconnect these resistors for adjusting the slow trip speed. In addition network RN1 has a winding PR2 of a plugging relay PR series connected between resistors 45 and 46 for controlling drop out of plugging in accordance with the speed of motor PM.

Figure 2:
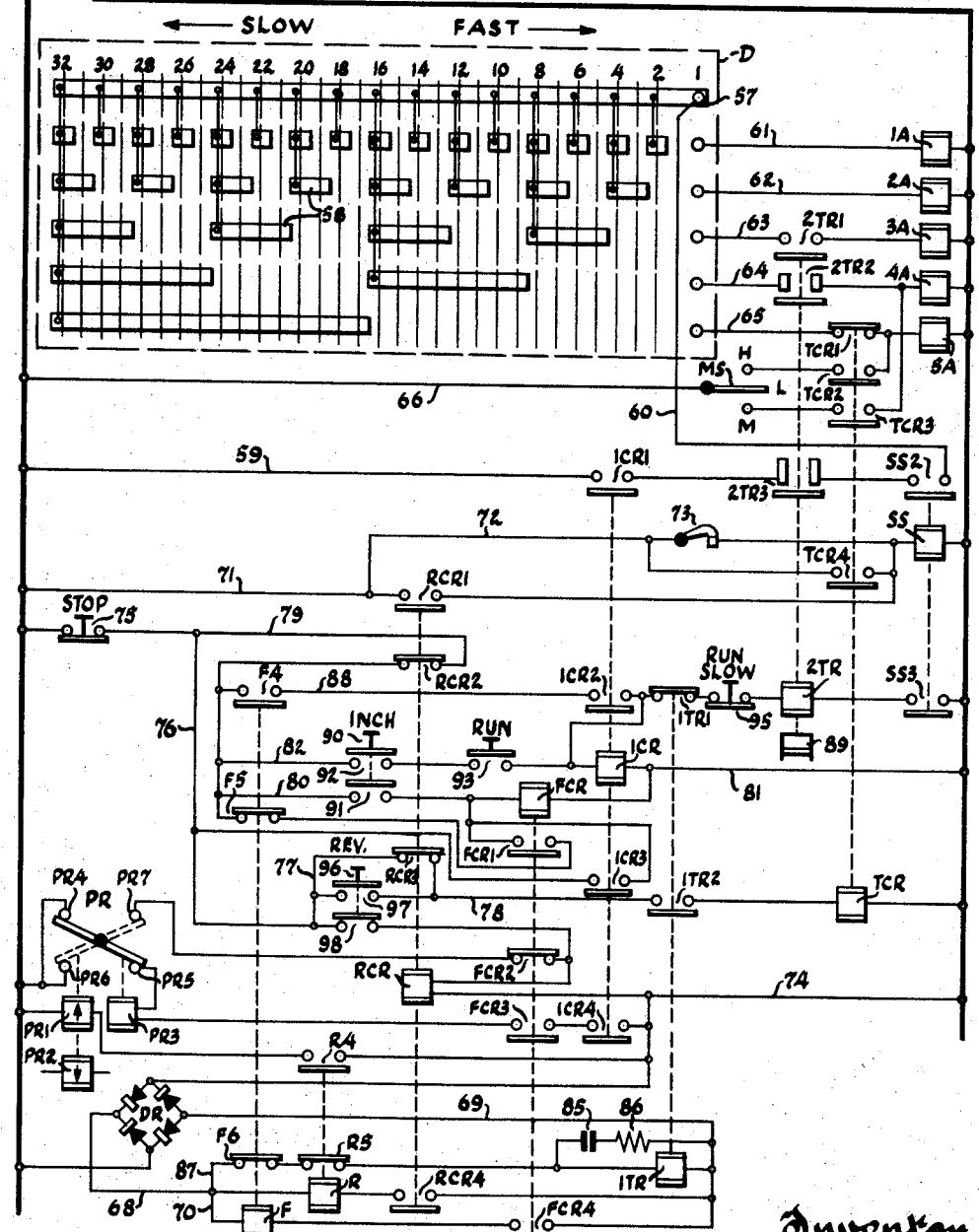
Fig. 2 shows diagrammatically control means for the control apparatus of Fig. 1.

Referring to Fig. 2 there is schematically depicted a well known manually rotatable drum switch D having a bus-bar 57 and a plurality of segments 58 electrically interconnected for selectively preparing energization circuits for the operating coils of speed control contactors 1A through 5A to be completed upon subsequent operation of the control network in the lower portion of Fig. 2. The aforementioned energization circuits may be traced from line L1 through conductor 59, contacts 1CR1, 2TR3 and SS2, conductor 60, bus-bar 57, the segments 58 of drum switch D in a selected position and one or a combination of conductors 61 through 65 and of the operating coils of contactors 1A through 5A to line L2. For example, at drum step 10 contactors 1A and 4A would be preselected for operation. Drum switch D has 32 positions for selection of any one of a like number of speed points as shown in Fig. 3. Another circuit for contactors 4A and 5A is provided across lines L1 and L2 through conductor 66 and a manual double-throw switch MS. Switch MS has an open low-torque position L, a medium-torque position M for preselecting contactor 4A for operation and a high-torque position H for preselecting contactor 5A for operation to selectively adjust the starting torque.

There is shown in the lower portion of Fig. 2 a control network whereby press motor PM can be controlled in a manner hereinafter described. More especially, this control network comprises a forward contactor F and normally-open contacts F4 and normally-closed contacts F5 and F6 in addition to contacts F1—3 in the motor primary circuit (Fig. 1), a reverse contactor R and normally-open contacts R4 and normally-closed contacts R5 in addition to contacts R1—3 in the motor primary circuit, and a trip contactor SS and normally-open contacts SS2 in the circuit from line L1 to drum switch D and normally-open contacts SS3 in circuit with the operating coil of a timing relay 2TR in addition to the aforementioned trip contacts SS1 in resistance network RN1 (Fig. 1). Contactors F and R are mechanically interlocked and their operating coils are alternatively connectable across lines L1 and L2 through a rectifier bridge DR and conductors 68 and 69, the circuit of the operating coil of contactor F branching through conductor 70. The operating coil of contactor SS is connected across line L1 and L2 through conductors 71 and 72 and a normally-closed trip switch 73.

Fig. 2 also includes a plurality of relays through the medium of which the aforementioned contactors are controlled. These relays include a plugging relay PR having coils PR1—2 and PR3, normally-closed contacts PR4 and PR5 and normally-open contacts PR6 and PR7 for controlling reverse energization of motor primary winding P in stopping from a forward running speed. Plugging relay PR is a double-throw type which is actuated to its full-line position by a differential winding combination comprising winding PR1 opposed by winding PR2. Winding PR1 is connectable across lines L1 and L2 through contacts R4 and conductor 74 while winding PR2 is series connected with commutating resistors 41—45 and trip resistor 46 across one phase of the motor secondary winding as aforedescribed in connection with Fig. 1. Winding PR2 is connected relative to the resistors of secondary network RN1 in the manner hereinbefore described so that during plugging contacts SS1 shunt out the adjustable portions 53, 54 of the secondary resistors. Such elimination of these adjustable resistors provides for a constant value of resistance always being in series with winding PR2 for the plugging operation, while commutating resistors 41—45 prevent a significant change in the current in winding PR2 when adjustable portion 51, 52 is adjusted. Such an arrangement is preferred to prevent variation in the drop out of plugging relative to motor speed when the secondary resistance is adjusted to compensate for a change in load. Relay PR also has a coil PR3 for actuation thereof to its dotted-line position to prepare for plugging.

A torque control relay TCR has normally-closed contacts TCR1 for disconnecting the operating coil of contactor 5A from drum switch D, normally-open contacts TCR2 and TCR3 for connecting manual switch MS to the operating coils of contactors 4A and 5A, and normally-open contacts TCR4 in parallel with limit switch 73 for energizing the operating coil of contactor SS during starting in the event trip switch 73 is open. The operating coil of relay TCR is connectable across lines L1 and L2 through a normally-closed Stop switch 75 and conductors 76, 77 and 78. A forward control relay FCR has normally-open contacts FCR1 for establishing a momentary holding circuit for its operating coil, normally-closed contacts FCR2 for preventing operation of reverse control relay RCR, normally-open contacts FCR3 for energizing coil PR3 and normally-open contacts FCR4 for energizing the operating coil of forward contactor F. The operating coil of relay FCR is connectable across lines L1 and L2 through Stop switch 75 and conductors 79, 80 and 81. Control relay 1CR has normally-open contacts 1CR1 in the circuit of drum switch D, normally-open contacts 1CR2 for preparing a holding circuit for its operating coil, normally-open contacts 1CR3 for establishing a second holding circuit for the operating coil of relay FCR in series with Stop switch 75 and conductor 81 and normally-open contacts 1CR4 for controlling coil PR3 during running. Relay 1CR is connectable across lines L1 and L2 through Stop switch 75 and conductors 79, 82 and 81. Reverse control relay RCR has normally-open contacts RCR1 in parallel with limit switch 73 and contacts TCR4 for maintaining energization of the operating coil of contactor SS during plugging independently of either the trip switch 73 or relay TCR, normally-closed contacts RCR2 for interrupting energization circuits of the operating coils of the forward control and accelerating relays, normally-closed contacts RCR3 for preventing operation of relay TCR during plugging, and normally-open contacts RCR4 for energizing the operating coil of reverse contactor R. A first timing relay 1TR has a timing circuit comprising a capacitor 85 and resistor 86 series-connected across its operating coil for rendering the former slow-to-release to deenergize the operating coil of relay TCR at its normally-open contacts 1TR2 and energize the operating coil of relay 2TR at its normally-closed contacts 1TR1. Timing relay 1TR is so constructed and arranged that contacts 1TR2 open approximately three seconds after deenergization of its winding to release relay TCR followed by the closure of its contacts 1TR1 to energize the operating coil of relay 2TR. The operating coil of relay 1TR is energized across rectifier bridge DR through conductors 68, 87 and 69. A second timing relay 2TR has normally-open contacts 2TR1 and 2TR2 for energizing the operating coils of contactors 3A and 4A, respectively, and normally-open contacts 2TR3 for completing the circuit from line L1 to drum switch D. The operating coil of relay 2TR is connected across lines L1 and L2 through Stop switch 75 and conductors 79 and 88. Relay 2TR is a conventional slow-to-operate timing relay of the pneumatic type having a dashpot 89 which is adjusted so that its contacts 2TR3 close first followed in a few seconds by closure of its contacts 2TR2 and contacts 2TR1 a second or two later to gradually accelerate motor PM.

Inch switch 90 has normally-open contacts 91 in the energization circuit of the operating coil of relay FCR for initiating operation of the press at a slow speed in a forward direction and normally-open contacts 92 which, in combination with a normally-open Run switch 93, in the energization circuit of the operating coil of relay 1CR initiate running of the press and acceleration of the latter to a preselected forward speed. A Run Slow switch 95 in the energization circuit of the operating coil of relay 2TR affords a slow running speed. The Run switch 93 and Run Slow switch 95 are shown as separate switches of the pushbutton type but, if desired, a well known unitary switch having normally-open and normally-closed contacts similar to the contacts of switches 93 and 95 and a pushbutton surrounded by a rotatable sleeve may be used in place thereof. Such unitary switch would be so constructed and arranged that the first mentioned contacts would close and the last mentioned contacts would open when the pushbutton is pressed and return to their normal positions when the pushbutton is released. Rotation of the sleeve would operate only the last mentioned contacts through the inter-position of a cam actuator to open the same to interrupt the operating circuit of relay 2TR. Stop switch 75 controls stopping with plugging and Reverse switch 96 controls operation of the press in a reverse direction at a slow speed at its normally-open contacts 97 and 98, all as hereinafter to be described.

The table in Fig. 3 shows the order of commutation of contacts 1A1 through 5A1 in secondary resistance network RN1, the closed condition of these contacts being indicated by X. It will be noted that 32 steps of drum switch D afford a like number of speed points in going from a condition of maximum motor secondary resistance to a condition of zero external secondary resistance or vice versa. The repeated commutation of resistors 41 through 44 affords a larger number of speed points with a substantial saving in the number of resistors, contacts and wiring required. The values of these resistors are suitably selected so that the change in speed of motor PM from a given speed point to higher or lower speed points will be substantially linear.

Considering the operation of the motor controller, let it be assumed that power supply lines L1, L2 and L3 are energized from a 3-phase power supply source (not shown) and that the parts are in the positions shown in Figs. 1 and 2.

Upon closure of knife switch DS in lines L1, L2 and L3 rectified alternating current is supplied to the operating coil of relay 1TR from line L1 through rectifier bridge DR, conductors 68 and 87, contacts F6 and R5, the operating coil of relay 1TR, conductor 69 and rectifier bridge DR to line L2. Current is also supplied to the timing circuit comprising resistor 86 and capacitor 85 to charge the latter. Relay 1TR energizes and opens its contacts 1TR1 to interrupt the energization circuit of the operating coil of relay 2TR and closes its contacts 1TR2 to establish an energization circuit for the operating coil of relay TCR. Relay TCR being thus energized opens its contacts TCR1 to isolate the operating coil of contactor 5A from drum switch D, closes its contacts TCR2 and TCR3 to energize the operating coil of either contactor 4A or 5A or neither depending upon the position of manual switch MS, and closes its contacts TCR4 to establish an energization circuit for the operating coil of contactor SS shunting switch 73. The energization circuit of the operating coil of relay TCR may be traced from conductor L1 through Stop switch 75, conductors 76 and 77, contacts RCR3, conductor 78, contacts 1TR2, the operating coil of relay TCR to line L2. Upon the closure of switch DS, the operating coil of contactor SS is also energized from line L1 through conductors 71 and 72, switch 73, the operating coil of contactor SS to line L2. Contactor SS energizes and closes its contacts SS1 (Fig. 1) to shunt resistor 46, closes its contacts SS2 to prepare a circuit from line L1 to drum switch D and closes its contacts SS3 in the energization circuit of the operating coil of relay 2TR. Let it be assumed that switch 73 is initially closed so that the operating coil of contactor SS energizes immediately following the closure of switch DS. On the other hand, should switch 73 be initially open, the operating coil of contactor SS would energize upon the closure of contacts TCR4. Let it also be assumed that manual switch MS is in the central position L depicted in Figure 2 so that neither contactor 4A nor 5A energizes responsive to energization of the operating coil of relay TCR. The controller is now in its "ready" condition.

Starting of press motor PM is controlled by Inch switch 90; Inch switch 90, Run switch 93 and Run Slow switch 95 in combination, or Reverse switch 96.

To operate press motor PM at a low speed in the forward direction Inch switch 90 is pressed to close contacts 91 to establish an energization circuit for the operating coil of relay FCR from line L1 through Stop switch 75, conductor 79, contacts RCR2, conductor 80, contacts 91, the operating coil of relay FCR and conductor 81 to line L2. Relay FCR being thus energized closes its contacts FCR1 in series with contacts F5 to establish a holding circuit for its operating coil shunting contacts 91, opens its contacts FCR2 to prevent energization of the operating coil of reverse control relay RCR and closes its contacts FCR4 to energize the operating coil of forward contactor F across rectifier bridge DR through conductors 68 and 70, the operating coil of contactor F, contacts FCR4 and conductor 69. Forward contactor F energizes in this circuit and closes contacts F1—3 to energize the primary winding of press motor PM, and opens its contacts F5 to interrupt the holding circuit for the operating coil of relay FCR. Thus the holding circuit for the operating coil of relay FCR, shunting contacts 91, is established only momentarily so that if contacts 91 are momentarily operated, the forward control relays will not be released. This will prevent welding of forward contacts F1—3 which might occur if the latter could be rapidly closed and opened by Inch switch 90. Forward contactor F also opens its contacts F6 to interrupt the energizing circuit of the operating coil of relay 1TR to initiate release of the latter. Capacitor 85 begins to discharge through the operating coil of relay 1TR in series with resistor 86 to render relay 1TR slow-to-release. After about three seconds relay 1TR opens its contacts 1TR2 to deenergize the operating coil of relay TCR. Relay TCR being thus released closes its contacts TCR1 to reconnect the operating coil of contactor 5A to drum switch D and opens its contacts TCR2 and TCR3 which are ineffective because switch MS is assumed to be in its depicted central low torque position L. If switch MS had initially been placed in its medium or high torque position, then relay TCR would temporarily energize the operating coil of the corresponding contactor 4A or 5A to shunt secondary resistor 44 or 45 to afford a selectively adjustable medium or high starting torque for motor PM. Relay TCR also opens its contacts TCR4 to interrupt the circuit shunting switch 73. It should be noted that the operating coil of relay TCR does not deenergize on very short inching operations, but only when switch 90 is pressed long enough for relay 1TR to time out. The press now runs forward at a low speed which is determined by all of the speed regulating resistors except resistor 46 being in circuit.

Should trip switch 73 be opened in response to abnormal conditions after the release of relay TCR, the operating coil of contactor SS would be deenergized to insert resistor 46 into the motor secondary circuit to afford a slower speed. When Inch switch 90 is released to permit contacts 91 to open, the operating coil of relay FCR deenergizes and interrupts the energization circuit of the operating coil of forward contactor F at contacts FCR4. Contactor F opens its contacts F1—3 to interrupt the motor primary circuit to permit motor PM to stop. Contactor F also closes its contacts F6 to reenergize the operating coil of relay 1TR. Relay 1TR being thus energized closes its contacts 1TR2 to reenergize the operating coil of relay TCR to return the controller to its "ready" condition.

To operate press motor PM at a predetermined and controlled rate of speed in the forward direction and to obtain gradual acceleration to such speed, drum switch D is preset at a desired one of the 32 speed steps afforded by the latter. Let it be assumed that drum switch D is preset at step 32 representing its maximum speed point. Inch switch 90 and Run switch 93 are simultaneously pressed to close contacts 91 and 92 and switch 93, to establish an energizing circuit for the operating coil of relay 1CR across lines L1 and L2. This circuit may be traced through Stop switch 75, conductor 79, contacts RCR2, conductor 82, contacts 92, switch 93, the operating coil of relay 1CR and conductor 81. Contacts 91 establish an energizing circuit for the operating coil of relay FCR from line L1 through Stop switch 75, conductor 79, contacts RCR2, conductor 80, contacts 91, the operating coil of relay FCR and conductor 81 to line L2. Relay 1CR thus being energized closes its contacts 1CR1 to prepare a circuit from line L1 to drum switch D, closes its contacts 1CR2 to prepare a holding circuit for its operating coil in parallel with contacts 92 and switch 93, closes its contacts 1CR3 to establish a holding circuit for the operating coil of relay FCR and closes its contacts 1CR4 to prepare an energization circuit for coil PR3. Relay FCR opens its contacts FCR2 to prevent energization of the operating coil of reverse control relay RCR, closes its contacts FCR3 to energize coil PR3 and closes its contacts FCR4 to establish an energizing circuit for the operating coil of forward contactor F. The circuit of coil PR3 is traced from line L1 through contacts PR4 and PR5, coil PR3, contacts FCR3 and 1CR4 and conductor 74 to line L2. Coil PR3 being thus energized responds to actuate relay PR to its dotted-line position which has no immediate effect except to deenergize its coil PR3. Relay PR remains in its new position without dependence on its coil PR3. The foregoing prepares the controller for stopping operation utilizing plugging as hereinafter described. Contactor F energizes and closes its contacts F1—3 to connect the power supply source to primary winding P of motor PM (Fig. 1) as hereinbefore described. Motor PM starts in the forward direction at a low starting torque determined by relay SS having shunted secondary resistor 46 or at a medium or high starting torque depending upon the position of switch MS. Contactor F also closes its contacts F4 to complete the holding circuit for the operating coil of relay 1CR and opens its contacts F6 to deenergize the operating coil of relay 1TR to initiate release of the latter.

The Inch and Run switches may be released to open contacts 91 and 92 and switch 93 at any time after energization of the operating coil of contactor F without releasing the forward control relays because the operating coil of relay 1CR is held energized by contacts 1CR2 and F4 and the operating coil of relay FCR is held energized by contacts 1CR3. When deenergization of the operating coil of relay 1TR was initiated by opening of contacts F6, relay 1TR releases under the control of its timing circuit to deenergize the operating coil of relay TCR as hereinbefore described. Relay 1TR also closes its contacts 1TR1 to establish an energization circuit for the operating coil of timing relay 2TR. This circuit may be traced from line L1 through Stop switch 75, conductor 79, contacts RCR2 and F4, conductor 88, contacts 1CR2, 1TR1, switch 95, the operating coil of relay 2TR and contacts SS3 to line L2. Relay 2TR being thus energized closes its contacts 2TR3 to complete the circuit from line L1 to busbar 57 of drum switch D through conductor 59, contacts 1CR1, 2TR3 and SS2 and conductor 60.

It was heretofore assumed that drum switch D is preset at step 32. Thus energization circuits may be traced from line L1 through the above-traced circuit to busbar 57 of drum switch D, and to segments 58 in position 32 where it divides. One branch continues through conductor 61 and the operating coil of contactor 1A to line L2, a second branch continues through conductor 62 and the operating coil of contactor 2A to line L2 and a third branch continues through conductor 65, contacts TCR1 and the operating coil of contactor 5A to line L2. Contactors 1A, 2A and 5A energize and close their respective contacts 1A1, 2A1 and 5A1 in secondary resistor network RN1 to shunt resistors 41, 42 and 45. Motor PM accelerates to an intermediate speed determined by the resistance remaining in its secondary winding. After a few seconds delay determined by the timing characteristics of relay 2TR the latter closes its contacts 2TR2 to establish an energization circuit for the operating coil of contactor 4A from the segment in drum position 32 through conductor 64, contacts 2TR2 and the operating coil of contactor 4A to line L2. Contactor 4A thus being energized closes its contacts 4A1 in resistor network RN1 to accelerate motor PM to greater speed. A second or two later relay 2TR closes its contacts 2TR1 to establish a similar energization circuit for the operating coil of contactor 3A from the segment in drum position 32 through conductor 63, contacts 2TR1 and the operating coil of contactor 3A to line L2. Contactor 3A closes its contacts 3A1 in resistor network RN1 to accelerate motor PM to its final preset speed.

The speed of motor PM may now be changed to any one of its other 31 speed points by manually rotating drum switch D in the "slow" direction for slower speed or the "fast" direction for faster speed, as indicated adjacent drum switch D.

The speed of motor PM may be reduced to a low value without resetting drum switch D by opening Run Slow switch 95 to interrupt the energization circuit of the operating coil of relay 2TR. Relay 2TR being thus deenergized opens its contacts 2TR3 to interrupt the feed from line L1 to drum switch D to release contactors 1A through 5A and opens its contacts 2TR1 and 2TR2 to interrupt further the energizing circuits of the operating coils of contactors 3A and 4A. Contactors 1A through 5A release to reinsert all of the commutating resistors in the secondary network to slow down motor PM to a low speed.

Motor PM may be reaccelerated to its former speed preset on drum switch D by closing Run Slow switch 95 to reenergize the operating coil of relay 2TR. Timing relay 2TR reenergizes the operating coils of contactors 1A through 5A to reaccelerate motor PM in a plurality of incremental steps as hereinbefore described.

In the event of trouble conditions, such as for example a misfit sheet in the press or limit conditions, switch 73 is automatically opened by the press to deenergize the operating coil of contactor SS and open its contacts SS1, SS2 and SS3. Contacts SS1 reinsert resistor 46 in the secondary network. Opening of contacts SS2 disconnects drum switch D from line L1 to deenergize the operating coils of commutating contactors 1A through 5A to reinsert all of the remaining resistors in the secondary network. Opening of contacts SS3 deenergizes the operating coil of relay 2TR which responds to open contacts 2TR1, 2TR2 and 2TR3. Opening of contacts 2TR1 and 2TR2 interrupts further the energization circuits of the operating coils of contactors 3A and 4A, while opening of contacts 2TR3 interrupts further the drum switch feed line to prepare the controller for reacceleration. Thus, all of the secondary resistance is reinserted without running drum switch D to position 1, to trip the motor speed to an extra-slow value.

When the abnormal conditions are corrected and trip switch 73 is reclosed, the operating coil of contactor SS reenergizes and closes its contacts SS1 to shunt resistor 46 in the secondary network to reaccelerate the press motor one incremental step. Reclosure of contacts SS2 prepares a circuit from line L1 to drum switch D, and reclosure of contacts SS3 reenergizes the operating coil of relay 2TR which responds and closes its contacts 2TR3, 2TR2 and 2TR1 in the hereinbefore-described timed sequence to reaccelerate the press in three more incremental steps to its former speed as predetermined by the setting of drum switch D.

To stop the press Stop switch 75 is opened to deenergize the operating coils of relays 1CR and FCR. Relay 1CR thus being deenergized responds and opens its contacts 1CR1 to interrupt the feed line to drum switch D and opens its contacts 1CR2 and 1CR3 to interrupt the holding circuits of the operating coils of relays 1CR and FCR. Relay FCR responds and opens its contacts FCR4 to interrupt the circuit of the operating coil of contactor F and closes its contacts FCR2 to establish an energization circuit for the operating coil of reverse control relay RCR. Upon interruption of the feed line to drum switch D, contactors 1A through 5A reinsert commutating resistors 41 through 45 in the secondary network to limit the plugging current and torque to a reasonable value to reduce the severity of the plugging stop. Stop switch 75 also opens the energizing circuit of the operating coil of relay 2TR which responds and opens its contacts 2TR1, 2TR2 and 2TR3 at further points in the energization circuits of the operating coils of contactors 1A through 5A. Contactor F deenergizes and opening of its contacts F1—3 disconnects the power supply source from the primary winding P of motor PM. The aforementioned circuit of the operating coil of relay RCR is traced from line L1 through contacts PR6 and PR7, contacts FCR2, the operating coil of relay RCR and conductor 74 to line L2. Relay RCR energizes and closure of its contacts RCR1 establishes a circuit for the operating coil of contactor SS independently of trip switch 73. Opening of its contacts RCR2 interrupts further the energization circuits of the operating coils of the forward control and accelerating relays, and opening of its contacts RCR3 prevents energization of the operating coil of relay TCR during plugging. Contactor SS is maintained energized during plugging to shunt resistors 46, 53 and 54 effectively out of circuit through its closed contacts SS1 to maintain constant resistance in series with winding PR2 regardless of the setting of switch 56. The foregoing prevents variation in the drop out of plugging when the trip speed is adjusted at switch 56. Relay RCR also closes its contacts RCR4 to energize the operating coil of reverse contactor R. Contactor R responds and closes its contacts R1—3 to apply reverse power to the primary winding P of motor PM. Contactor R closes its contacts R4 to establish an energizing circuit for winding PR1 from line L1 through winding PR1, contacts R4 and conductor 74 to line L2. Winding PR1 tends to actuate relay PR into its full-line position but this action is opposed by winding PR2 receiving its energization from secondary resistance network RN1. When the speed of motor PM approaches zero with a consequent reduction in the value of current flowing through winding PR2, the magnetic force of winding PR1 overcomes that of winding PR2 to reset relay PR to its full-line position. Its energization circuit being thus interrupted at contacts PR6 and PR7, relay RCR deenergizes and opens its contacts RCR4 and thereby interrupts the energizing circuit of the operating coil of contactor R. Contactor R thereupon releases to open its contacts R1—3 and deenergize the motor primary winding to permit motor PM to stop. Contactor R also opens its contacts R4 to interrupt the circuit of winding PR1 and closes its contacts R5 to reenergize the operating coil of relay 1TR followed by the reenergization of the operating coil of relay TCR by closure of contacts 1TR2, when Stop switch 75 is reclosed. The controller is again in its "ready" condition.

To operate motor PM in a reverse direction Reverse switch 96 is pressed to close contacts 97 and 98. An energizing circuit is established for the operating coil of relay RCR from line L1 through Stop switch 75, conductor 76, contacts 98, the operating coil of relay RCR and conductor 74 to line L2. Contacts 97 close to establish a holding circuit for the operating coil of relay TCR. Relay RCR being thus energized responds and closes its contacts RCR1 to establish a circuit for the operating coil of contactor SS independently of trip switch 73, opens its contacts RCR2 to disconnect the operating coils of forward control and accelerating relays and closes its contacts RCR4 to energize the operating coil of reverse contactor R across rectifier bridge DR. Contactor R responds and closes its contacts R1—3 to energize primary winding P of the driven motor in the reverse direction. Contactor R opens its contacts R5 to deenergize the operating coil of timing relay 1TR as hereinbefore described. Motor PM starts in a reverse direction at a torque determined by contactor SS at contacts SS1 having shunted resistor 46. As hereinbefore described, the starting torque may be adjusted by manual switch MS to place either contactor 4A or 5A under the control of torque control relay TCR during the starting period. Upon the deenergization of the operating coil of relay 1TR, its contacts 1TR2 open after a predetermined time as determined by its timing characteristics to deenergize the operating coil of relay TCR. The motor now runs at a slow speed in the reverse direction.

To stop the motor Reverse switch 96 is released to open its contacts 97 and 98. Relay RCR deenergizes and opens its contacts RCR4 to interrupt the circuit of the operating coil of contactor R. Contactor R being thus deenergized opens its contacts R1—3 to disconnect the motor primary winding from the power supply source and permit motor PM to stop. Contactor R also closes its contacts R5 to reenergize the operating coil of relay 1TR followed by the reenergization of the operating coil of relay TCR. The controller is now in its "ready" condition.

When knife switch DS is opened, the controller is disconnected from the power supply source and the operating coils of relays 1TR and TCR and contactor SS are deenergized.

I claim:

1. In an electrical controller for a motor having a secondary resistance network, speed control means comprising said secondary resistance network and a plurality of electroresponsive devices for commutating portions of said secondary resistance network to adjust the speed of the motor, a speed selector device operable to select predetermined combinations of said commutating devices for operation to preselect a desired one of a multiplicity of motor operating speeds, and control means for initiating energization of the motor, the improvement comprising selector means having a plurality of operating positions and operable to select desired ones of said commutating devices for operation thereby to preselect a desired value of motor starting torque, torque control means responsive to operation of said control means for causing said selected device to commutate said secondary resistance network to establish said preselected value of motor starting torque, means responsive to said operation of said control means after elapse of a predetermined time interval for causing said torque control means to restore said selected commutating device thereby to change the motor torque, and means comprising said commutating devices including said restored device operable in response to said restoring means for thereafter commutating said secondary resistance network to accelerate the motor in a plurality of steps to a speed determined by the setting of said speed selector device.

2. The invention defined in claim 1, wherein said torque control means comprises means operable conjointly therewith for disconnecting said selected electroresponsive device from said speed selector device during said starting torque time interval and operable at the end of said time interval to reconnect said selected electroresponsive device to said speed selector device.

3. In an electrical motor controller for operating graphic arts machinery, in combination with speed control means settable to preselect a desired one of a multiplicity of motor operating speeds, control means operable to effect energization of the motor, means responsive to operation of said control means for causing starting and acceleration of the motor to said preselected speed, and decelerating control means responsive to abnormal conditions in the machinery for causing said accelerating means to decelerate the motor to a low speed, the improvement comprising selector means operable to preselect desired ones of a plurality of different values of motor starting torque, torque control means operable in response to operation of said control means for affording the preselected value of motor starting torque, and means responsive to operation of said torque control means for bypassing said decelerating control means thereby to enable starting of the motor under abnormal conditions.

4. The invention defined in claim 3, wherein said decelerating control means comprises an electroresponsive device for controlling said accelerating means and a switch operable by the machinery under abnormal conditions in circuit with said electroresponsive device, and said bypassing means comprises a contact for completing a circuit for said electroresponsive device in shunt of said machine operated switch.

5. In an electrical controller for a motor having a secondary resistance network, speed control means comprising electroresponsive devices for commutating portions of said secondary resistance network to provide for operation of the motor at different running speeds, tripping control means responsive to abnormal conditions for controlling the effective resistance in said network to decrease the motor speed to a predetermined low value, selector means for changing the value of effective resistance in said network to adjust the value of said low speed, means for initiating stopping of the motor comprising plugging control means and means for terminating the action of said plugging control means when the motor speed approaches zero value, said terminating means comprising a differential relay including a winding for terminating the action of said plugging control means and an opposing winding connected in said resistance network and responsive to current flowing in said network for maintaining the first mentioned winding ineffective until the motor speed approaches zero value, and means responsive to operation of said plugging control means for preventing operation of said tripping control means thereby to render effectiveness of said opposing winding relative to motor speed independent of said adjustment of said low speed.

6. The invention defined in claim 5, wherein said resistance network comprises low speed resistance means shunted by said tripping control means during normal operation of the motor and effectively insertable in circuit with said opposing winding in response to abnormal conditions, said low speed resistance means being adjustable in value by said low-speed-adjusting selector means, and said means for preventing operation of said tripping control means comprises a contact operable by said plugging control means for completing an energizing circuit for said tripping control means to maintain said low speed resistance means shunted during plugging whereby the action of said opposing winding is not varied by adjustment of said low speed.

7. In an electrical controller for a motor having a secondary resistance network, speed control means comprising electroresponsive devices for commutating portions of said secondary resistance network to provide for operation of the motor at different running speeds, means for initiating stopping of the motor comprising plugging control means and means for terminating the action of said plugging control means when the motor speed approaches zero value, said terminating means comprising a differential relay including a winding for terminating the action of said plugging control means and an opposing winding connected in said resistance network and responsive to current flowing in said network for maintaining the first mentioned winding ineffective until the motor speed approaches zero value, compensating resistance connectable in said network, and switch means selectively operable to connect said compensating resistance in parallel with said opposing winding at any of the aforesaid running speeds to adjust the speed of the motor to compensate for a change in motor load, such parallel connection of said compensating resistance to adjust the speed of the motor preventing significant variation in effectiveness of said opposing winding relative to motor speed.

8. The invention defined in claim 7, wherein said secondary resistance network comprises a plurality of commutatable resistors connected in series with said opposing winding and said switch means is operable to connect said compensating resistance in parallel with said commutatable resistors and said opposing winding.

References Cited in the file of this patent

UNITED STATES PATENTS

| | | |
|---|---|---|
| 1,500,851 | Scott | July 8, 1924 |
| 2,064,302 | Frese | Dec. 15, 1936 |
| 2,409,264 | Feldhausen | Oct. 15, 1946 |
| 2,490,458 | Feldhausen | Dec. 6, 1949 |
| 2,625,672 | Calvert | Jan. 13, 1953 |